Dec. 17, 1963  L. A. MEDLAR  3,114,880
FLUID DAMPED ELECTRICAL METER
Filed July 26, 1960  3 Sheets-Sheet 1
FIG. 1
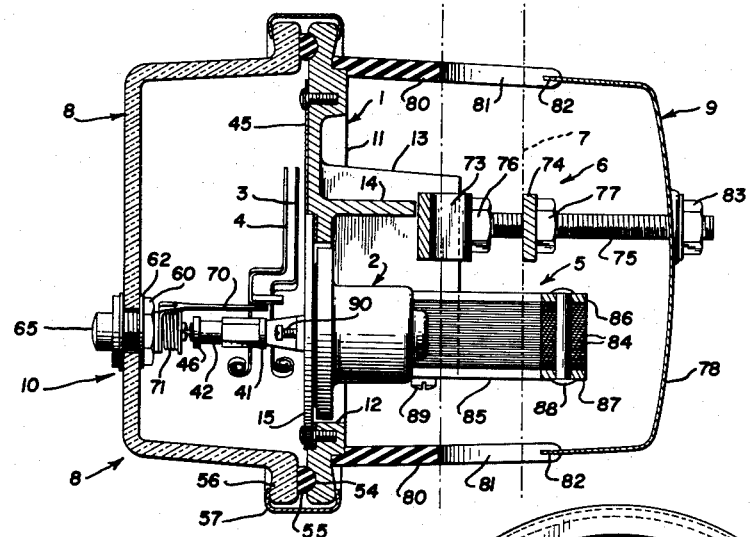
FIG. 3
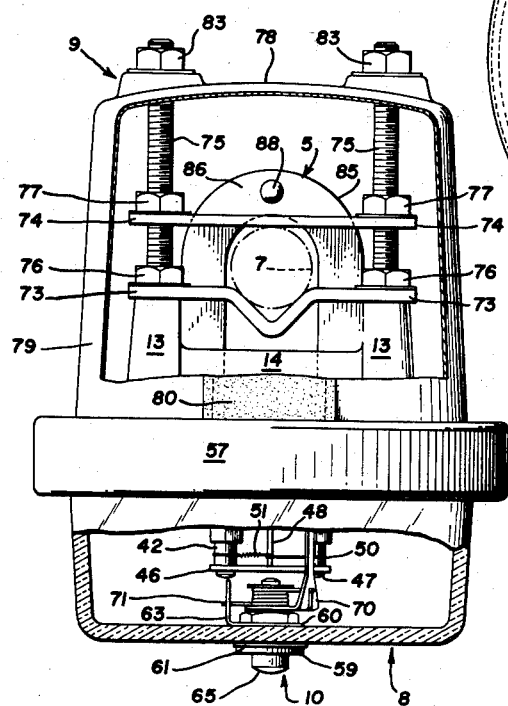
FIG. 2
INVENTOR.
LEWIS A. MEDLAR
BY D C Roylance
ATTORNEY Dec. 17, 1963
L. A. MEDLAR
3,114,880
FLUID DAMPED ELECTRICAL METER
Filed July 26, 1960
3 Sheets-Sheet 2
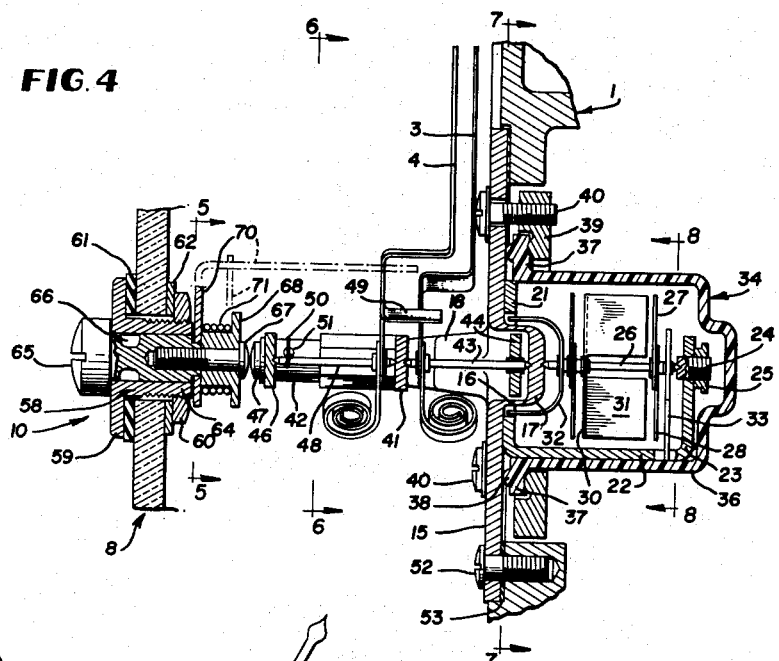
FIG. 4
FIG. 5
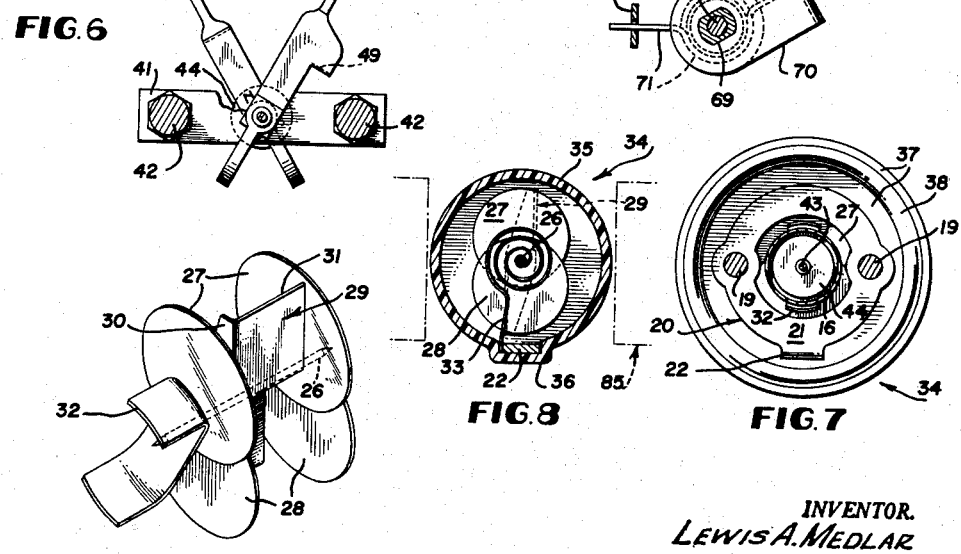
FIG. 6
FIG. 9
FIG. 8
FIG. 7
INVENTOR.
LEWIS A. MEDLAR
BY
ATTORNEY Dec. 17, 1963
L. A. MEDLAR
3,114,880
FLUID DAMPED ELECTRICAL METER
Filed July 26, 1960
3 Sheets-Sheet 3
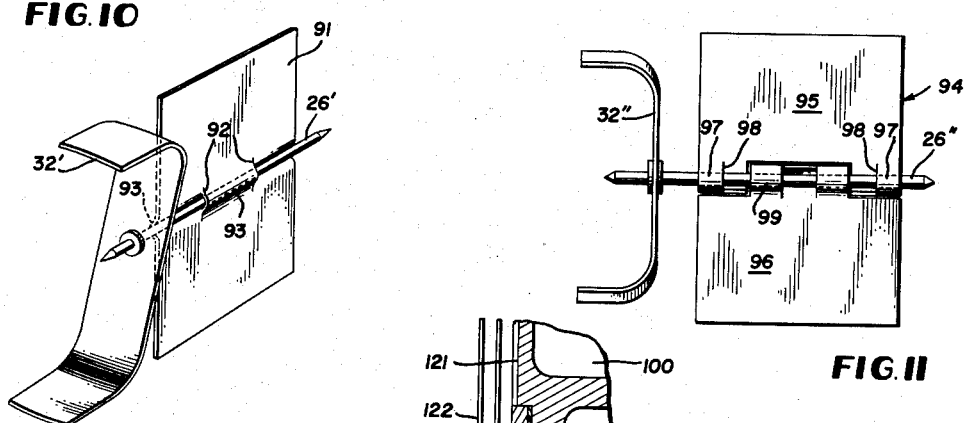
FIG.10
FIG.11
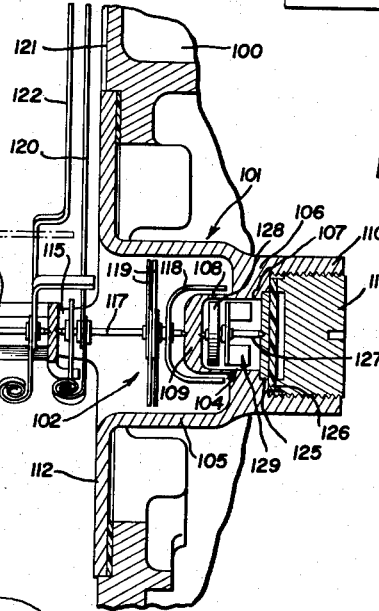
FIG.12
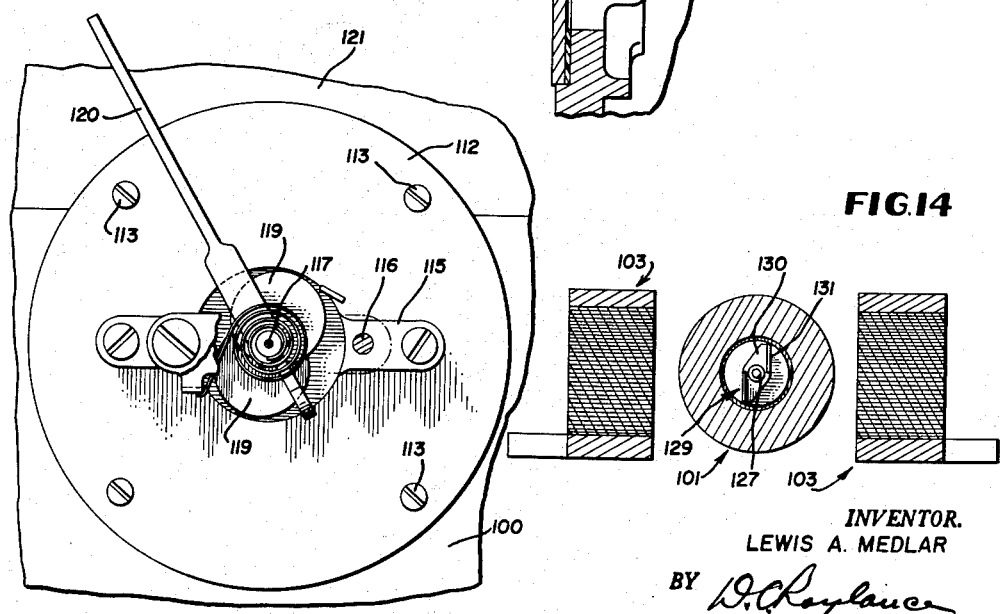
FIG.13
FIG.14
INVENTOR.
LEWIS A. MEDLAR
BY
ATTORNEY United States Patent Office 3,114,880
Patented Dec. 17, 1963

3,114,880
FLUID DAMPED ELECTRICAL METER
Lewis A. Medlar, Oreland, Pa., assignor, by mesne assignments, to Lewis A. Medlar, Elmer Adkins, and Lewis Electrical Equipment Co., a copartnership
Filed July 26, 1960, Ser. No. 45,460
4 Claims. (Cl. 324—125)

This invention relates to slow response electrical meters and more particularly to such meters wherein the slow rate of response is attained by highly over-damping the meter movement.

A meter is said to be over-damped when the meter is at least substantially free from "over shoot," that is, movement of the indicator in response to a stepped input to the meter does not significantly pass the position corresponding to the magnitude of the input. In the usual meter applications, over-damping can be achieved in various ways and the response of the meter is fairly rapid. There are commercial applications, however, which require a meter with an unusually slow response. For such applications, wherein time periods from several minutes to half an hour, for example, are required for the meter to reach within 10% of full response, the meter movement must be highly over-damped. Such high over-damping of a meter movement is difficult to attain by practical means and prior-art workers have, therefore, usually abandoned the more conventional meter movements in favor of alternative devices, such as the so-called thermal meters, which have an inherent slow response and do not require damping.

The present invention embraces the discovery that a highly over-damped meter can be constructed with a relatively simple rotary meter movement, using at least one damping member of substantial size, relative to the moving parts of the meter, immersed in a viscous damping material, and that a meter can be made in this manner to have the slow response necessary, for example, when indicating the maximum load at a point in a power distribution system.

During initial work in connection with the invention, I employed a conventional meter movement, balanced in air and then totally immersed in a silicone oil. Such construction proved to be unsatisfactory, however, because, after the meter had been assembled and set aside, the indicator always departed from zero by as much as 25–30% of full scale deflection. Lengthy investigation of this phenomenon led to the discovery that, even though the meter movement had been properly balanced in air, it was not statically balanced when immersed in a fluid having a density different than air, and the unbalance of the movement when immersed causes the departure from zero. This poses a serious difficulty since, while such unbalance can theoretically be corrected by operating on moving parts which, while coupled to the movement, are not immersed in the damping material, the very slow movement of the parts by gravity alone, due to the high damping effect, makes such a procedure entirely impractical in commercial production. The invention accordingly provides meter movements which can be balanced in air and will then be statically balanced when the damping member or members are immersed in the viscous damping material.

In addition to the foregoing, an object of the invention is to provide a practical and relatively inexpensive meter for indicating the maximum load or ampere demand in a conductor forming part of a power distribution system.

Another object is to devise a meter movement in which a magnetically driven member of the movement is immersed in a viscous damping material and the movement is statically balanced when the driven member is so immersed.

A further object is to provide such a movement wherein a single member constitutes both the magnetically driven element of the movement and a damping element.

Yet another object is to provide a highly over-damped meter wherein a statically balanced movement is mounted within a closed and sealed chamber and immersed in a viscous damping material.

In order that the manner in which these and other objects are attained, in accordance with the invention, can be understood in detail, reference is had to the accompanying drawings, which form a part of this specification, and wherein:

FIG. 1 is an axial sectional view, with some parts shown in side elevation, of a demand meter constructed in accordance with one embodiment of the invention;

FIG. 2 is a front elevational view of the meter of FIG. 1 with part of the casing broken away for clarity of illustration;

FIG. 3 is a side elevational view of the meter of FIG. 1, with portions of the casing broken away for clarity;

FIG. 4 is a fragmentary axial sectional view similar to FIG. 1 but on a larger scale;

FIGS. 5-8 are transverse sectional views taken respectively on lines 5—5, 6—6, 7—7 and 8—8, FIG. 4;

FIG. 9 is a perspective view of the movement of the meter illustrated in FIGS. 1-4;

FIG. 10 is a perspective view of a modified form of driven element useful in the meter movement of the device of FIGS. 1-9;

FIG. 11 is an elevational view of another modified form of such driven element;

FIG. 12 is a view, similar to FIG. 4, of a meter constructed in accordance with another embodiment of the invention;

FIG. 13 is a view, mainly in front elevation and partly in transverse vertical section, taken on line 13—13, FIG. 12, and FIG. 14 is a transverse vertical sectional view taken on line 14—14, FIG. 12.

Turning now to the drawings in detail, and first to FIGS. 1-9 thereof, it will be seen that the embodiment of the invention here shown is a maximum load indicator or demand meter comprising a frame plate 1, a liquid-damped enclosed movement assembly 2 arranged to actuate a present reading indicator 3 and a maximum reading indicator 4, magnetic field producing means 5, a clamp 6 for attaching the device to a conductor 7, a transparent front casing 8, a back casing 9 and manual reset means indicated generally at 10.

Frame plate 1 is an integral non-magnetic member having a circular main body 11 provided with a circular opening 12 offset downwardly from the center of the plate as viewed in FIGS. 1 and 2. A pair of parallel, spaced projections 13 are provided, extending rearwardly from the main body of the frame plate, each on a different side of opening 12. A strengthening rib 14 extends horizontally between the projections 13 above opening 12, as seen in FIG. 1. Advantageously, frame plate 1 is formed by die casting from a suitable aluminum alloy.

The meter movement assembly 2 comprises a circular mounting plate 15 provided with an integrally formed, centered, cup-shaped portion comprising a thin, cylindrical side wall 16 and a relatively thick end wall 17, the latter being provided at each face with a centered pivot bearing depression. A pair of mounting bosses 18 project forwardly from the front face of mounting plate 15, each on a different side of the centered cup-shaped portion. Rigidly secured to the rear face of plate 15, as by screws 19, FIG. 7, is a bracket 20 including a front ring 21, a bottom arm 22 extending at right angles to the plane of ring 21, and an upright bearing support 23. A pivot bearing element 24 is threaded in a matching opening in support 23 and locked in place by a nut 25. The rear face of wall 17 is provided with a bearing recess, and an arbor 26 is rotatably supported by that recess and bearing element 24, the arbor extending at right angles to ring 21 coaxially with respect to wall 16.

As best seen in FIG. 9, arbor 26 carries two circular magnetic vanes 27 and two circular non-magnetic balancing vanes 28, each magnetic vane 27 being paired with one of the balancing vanes. Vanes 27, 28 are all of identical circular plan shape and of the same thickness, magnetic vanes 27 being of nickel-iron alloy and vanes 28 of brass of the same density as the magnetic alloy. Each vane 27, 28 is provided with a mounting hole offset radially from the center of the disc, the mounting holes and the radial offset being the same in each disc. As seen in FIG. 9, the vanes are so arranged that the main body portion of each magnetic vane 27 projects from arbor 26 in a direction opposite to that in which the main body portion of the corresponding non-magnetic vane projects. Hence, though each magnetic vane 27 is eccentric with respect to the axis of arbor 26, it is rotationally balanced on the arbor by the non-magnetic vane 28 with which it is paired. The two vanes 27 are disposed in identical angular positions on the arbor. The two pairs of vanes 27, 28 are spaced apart axially along arbor 26, one pair being adjacent wall 17 and the other adjacent bearing support 23. The vanes 27, 28 are secured to arbor 26 by staked bushings in a manner well known in the meter art.

Fixed to arbor 26 between the axially spaced pairs of vanes 27, 28 is a damping rotor 29. Formed of sheet aluminum, rotor 29 has a flat main body 30 which is symmetrical with respect to the arbor. Identical vanes 31 project from each half of body 30, being opposed across the arbor and facing generally in the direction of rotation of the arbor. Body 30 is disposed adjacent one of the pairs of vanes 27, 28 and vanes 31 project, axially of the assembly, for most of the distance between the two pairs of vanes 27, 28. It will be noted that rotor 29 is completely symmetrical with respect to its axis of rotation and is therefore completely balanced rotationally.

Adjacent wall 17, there is fixed to arbor 26 a magnetic member 32, the end portions of which are parallel, extend axially of the assembly and are closely adjacent to the outer surface of cylindrical wall 16. The magnetic member 32 is symmetrical with respect to arbor 26 and is homogeneous in construction, so as to be completely balanced on the arbor. At the other end of the assembly, a spiral spring 33 has its inner end fixed to arbor 26 and its outer end portion extended and engaged in a lateral notch in bottom arm 22 of bracket 20.

The movement is contained by a cup-shaped housing 34 of non-magnetic material. Advantageously, housing 34 is molded as an integral piece from polyethylene and includes a generally cylindrical main wall 35 having an axially extending outwardly offset portion 36 defining a groove which receives arm 22 of bracket 20, a side wall of the groove serving to hold the end of spring 33 engaged with arm 22, as will be clear from FIG. 8. At the mouth of housing 34, the inner surface of wall 35 has the configuration of the periphery of ring 21 of bracket 20 (see FIG. 7), the ring being embraced by the wall. Here, wall 35 is flanged outwardly, annular flange 37 having a sealing bead 38 engaging the rear face of mounting plate 15. The flange 37 is clamped tightly against plate 15, closing and completely sealing the housing, by a clamping ring 39 and a plurality of screws 40.

The chamber defined by the combination of housing 34 and plate 15, which chamber completely encloses the meter movement, is substantially completely filled with a viscous damping material, advantageously a silicone oil which is of selected viscosity and which exhibits a low change in viscosity with changes in temperature. It will thus be understood that the combination of arbor 26, vanes 27, 28, damping rotor 29 and magnetic member 32 is completely immersed in the viscous damping material which fills the chamber.

As has been pointed out in the introduction to this specification, the present invention is based in part upon the discovery that, if satisfactory operation of the meter is to be achieved, the combination of elements 26—28, 29 and 32 must be statically balanced when those elements are immersed in the viscous damping material. Even relatively small unbalances in any of the elements of the immersed meter movement will result in the meter moving off zero. In the embodiment illustrated, the vanes 27 and 28 balance each other because each vane 28 has the same volume as vanes 27 and is of a material of the same density. Thus, magnetic vanes 27 can be of a standard nickel-iron magnetic alloy, and non-magnetic vanes can be of 85% rich low brass, having the same density as the magnetic alloy.

A pivot bearing plate 41 extends across the front faces of bosses 18 and is secured thereto by the threaded ends of a pair of parallel, forwardly projecting studs 42. The center of plate 41 is aligned with arbor 26 and is provided with two pivot bearing depressions, one on each face. Wall 17 is provided on its front face with a centered bearing depression. A second arbor 43 is rotatable with one end engaged in the bearing depression on the front face of wall 17 and the other in the bearing depression on the rear face of plate 41, arbors 26 and 43 being axially aligned. Within the confines of wall 16, so as to be positioned between the ends of magnetic member 32, a diametrically magnetized permanent magnet disc 44 is fixed to arbor 43, the circular periphery of the disc being closely adjacent to the inner surface of wall 16. Adjacent plate 41, the present reading pointer 3 is fixed to arbor 43, the pointer projecting radially from the arbor across a dail 45, FIG. 1, secured to the front face of frame plate 1, when plate 15 is attached to the frame plate.

A second pivot bearing plate 46 is secured to the forward ends of studs 42, as by screws 47, and is provided on its rear face with a centered bearing depression. A third arbor 48 is rotatably supported by having one end engaged in the bearing depression in plate 46 and the other in the front bearing depression in plate 41. Maximum reading pointer 4 is fixed to arbor 48 adjacent plate 41. As will be clear from FIGS. 1, 4 and 6, pointer 4 includes a finger 49 projecting axially into the path of travel of pointer 3 on the up-scale side thereof. Hence, an up-scale movement of pointer 3 results in a like up-scale movement of pointer 4. Arbor 48 is frictionally restrained by a tensioned friction cord 50 extending helically about the arbor for at least one turn, the ends of cord 50 being attached to studs 42 and a coil spring 51 being interposed in the cord to tension the same. The frictional effect of cord 50 on arbor 48 is sufficiently small to allow pointer 4 to be moved up-scale when arbor 43 is turned by the meter movement, but is adequate to retain pointer 4 in that position to which it has been moved by pointer 3 until the meter is reset manually by actuation of reset means 10 as hereinafter described.

Mounting plate 15 is secured to the front face of frame plate 1, as by screws 52, FIG. 4, a thin polyethylene or like cushioning gasket 53 being interposed between the two plates. Housing 34 projects through opening 12, the clamping plate 39 and flange 37 being disposed within the opening. As best seen in FIG. 1, housing 34 is disposed between projections 13.

Adjacent its periphery, the front face of frame plate 1 is provided with a forwardly opening circular groove 54 in which is disposed a ring gasket 55, FIG. 1. The transparent front cover 8 is generally cup-shaped and has an outwardly projecting annular flange 56 held in sealing engagement with gasket 55 by a clamping ring 57.

Referring to FIG. 4, it will be seen that reset means 10 comprises a hollow sleeve 58 projecting through an opening in cover member 8, the sleeve being provided at its outer end with a head 59 and being threaded exteriorly at its outer end for cooperation with a nut 60. Sealing gasket 61 is disposed between head 59 and the outer face of cover member 8. A washer 62 is located between nut 60 and cover member 8 and includes a laterally disposed, rearwardly projecting extension constituting a detent finger 63, FIG. 5. Sleeve 58 and washer 62 are thus rigidly mounted on front cover member 8 by the clamping action between head 59 and nut 60.

Rotatably disposed in the bore of sleeve 58 is an actuating shaft 64 including a forwardly exposed knob 65, an annular groove 66 to receive a suitable material for effecting a seal between the shaft and sleeve, and a threaded, rearwardly opening bore in which is engaged a screw 67. Screw 67 mounts a hub 68. The rear end portion of shaft 64 includes a flat-sided tip 69, FIG. 5, upon which is engaged a reset finger 70, finger 70 having an opening of the same shape as tip 69 of the shaft, so that rotation of the shaft results in rotary movement of the finger. As best seen in FIG. 1, the finger 70 is annular in shape, including a portion extending axially of the meter into engagement with the up-scale side of maximum reading pointer 4. Finger 70 is biased to a normal, inactive, up-scale position by a torsion spring 71 extending helically about hub 68, the ends of the torsion spring being engaged respectively in an opening in detent 63 and an opening in finger 70. Knob 65 is provided with a screw-driver slot 72, FIG. 2, to allow shaft 64 to be rotated against the biasing force of spring 71 to return pointer 4 to zero position after a reading has been taken.

Clamp means 6, FIGS. 1 and 3, by which the meter is attached to conductor 7, comprises a fixed clamping bar 73 bent into a V at its center to receive conductor 7, a second clamping bar 74, and threaded studs 75. Studs 75 are fixed each in a different one of the projections 13 of frame plate 1 and extend rearwardly therefrom in mutually parallel relation. Bar 73 is provided with an opening at each end, through which openings studs 75 project, and the bar 73 is secured against the flat rear faces of projections 13 by nuts 76 threaded on the studs. Bar 74 also has an opening in each end, studs 75 extend through such openings, and the bar is urged against conductor 7, clamping the same in the V-shaped center portion of fixed bar 73, by nuts 77 threaded on the studs. Thus, clamp means 6 is effective for mounting the meter on conductor 7 and it will be clear that, when conductor 7 is an elevated power line, the meter can be so positioned as to be readable from the ground, using binoculars when necessary, and that, when so mounted, the meter can be reset by use of a suitable extension tool.

Back cover member 9 is generally cup-shaped, including a rear wall 78, a frusto-conical side wall 79 and a circular front edge. Two elongated notches, of such width and depth as to accommodate conductor 7, are provided in side wall 78 at transversely aligned points, both notches opening into the circular front edge of member 9, as will be clear from FIGS. 1 and 3. Each such notch is closed by a grommet 80 having an opening 81, FIG. 1, through which conductor 7 passes, and a peripheral groove 82, in which the edge portions of the corresponding notch in member 9 are engaged. Grommets 80 are each slit from opening 81 rearwardly to allow entry of conductor 5 into opening 81. The rear wall 78 of cover member 9 is provided with openings through which the studs 75 extend, and member 9 is clamped against frame plate 1 by nuts 83 threaded on the studs.

Magnetic field producing means 5 comprises a stacked series of U-shaped magnetic laminae 84 secured together to form a laminated magnetic structure 85 including top and bottom face plates 86 and 87, respectively, and fasteners 88. The parallel legs of magnetic structure 85 are of such length, and the curved base of such extent, that the unit can embrace conductor 7 and have its ends disposed each on a different side of housing 34. With the parts positioned in this manner, current flow in conductor 7 will generate magnetic flux in laminated structure 85 and so establish a magnetic field extending between the end portions of the legs of the U-shaped structure. Such magnetic field extends transversely across housing 34 in the area of eccentrically arranged magnetic vanes 27 and is effective to drive the meter movement against the biasing action of spring 33.

The ends of the legs of magnetic structure 85 are each disposed between housing 34 and a different one of projections 13 of frame member 1, between face plate 87 extending adjacent the bottom edges of the projections 13. Each leg of bottom face plate 87 is provided with an ear (not shown) projecting laterally outwardly along the bottom face of a different one of the projections 13 and magnetic structure 85 is mounted by screws 89, FIG. 1, extending through such ears. The ears on the legs of the bottom face plate 87 are provided with slots which accommodate screws 89, the slots extending parallel to the long dimensions of the legs of the magnetic structure. Thus, the slots allow adjustment of the magnetic structure axially with respect to the meter movement assembly 2.

A pair of positioning screws 90 extend rearwardly through plate 15, the screws 90 being threaded in the plate and each being aligned with the end face of a different leg of magnetic structure 85. Thus, screws 90 constitute stops into contact with which the ends of the magnetic structure are brought, prior to tightening of screws 89, so that the position of the magnetic structure can be adjusted precisely with respect to the meter movement assembly.

When the meter is to be installed on conductor 7, the back cover plate 9, the movable parts of clamp means 6 and the laminated magnetic structure 85 are removed. Clamp means 6 is then applied to conductor 7, so supporting the meter in the desired position for viewing from the ground, assuming that conductor 7 is an overhead power line. Magnetic structure 85 is then fixed in place by means of screws 89. Back cover plate 9 is then installed, the slitted grommets 80 opening to allow entry of conductor 7 into opening 81. Knob 65 is then rotated counterclockwise to assure that maximum reading pointer 44 is at zero position.

In operation, changes in current flow in conductor 7 cause corresponding changes in the magnetic field extending between the ends of the legs of U-shaped magnetic structure 85. Such changes in the magnetic field tend to result in rotation of arbor 26, it being understood that eccentrically mounted magnetic vanes 27 tend to rotate into alignment with the magnetic field. However, if the change in current flow in conductor 7 is a sudden or transient change, to which the meter is not to respond, little or no movement of arbor 26 will result because of the damping effect of the viscous material in housing 34 on rotor 29. On the other hand, when the change in current flow is of extended duration, such damping effect is gradually overcome, magnetic vanes 27 being rotated eventually into a position of alignment with the magnetic field.

Any rotation of arbor 26 causes a corresponding rotation of magnetic member 32. Such movement of member 32 is transmitted to arbor 43, and thus to present indicating pointer 3, by reason of the coupling provided between member 32 and the diametrically magnetized permanent magnet disc 44. In this connection, it is to be noted that arbor 43 is not connected directly to any spring biasing means but rather is biased to zero position, through the magnetic coupling, by spring 33.

The construction of the embodiment shown in FIGS. 1–9 is included herein as one preferred embodiment of a highly over damped slow response meter involving a movement which, in accordance with the invention, is statically balanced when elements thereof are immersed in a viscous damping material. Other features of this construction are claimed in my copending application Serial Number 45,459, filed concurrently herewith.

While the embodiment of FIGS. 1–9 comprises a damping member separate from the driven members of the meter movement, it is possible to construct a meter in accordance with the invention wherein a single member serves both as the damping member and as a driven element of the movement. FIG. 10 illustrates a movement assembly of this kind which can be substituted for that shown in FIG. 9. Referring in detail to FIG. 10, the arbor 26' and magnetic member 32' are identical with the corresponding elements hereinbefore described. In this embodiment, a single paddle 91 completes the assembly. Paddle 91 is rectangular in shape, being formed of a single piece of homogeneous magnetic sheet metal. The paddle is provided with parallel slits at 92, and coaxially aligned, oppositely curving, semi-circular portions 93 are formed, as shown, to embrace the arbor 26', the paddle being effectively fixed to the arbor by frictional engagement of these semi-circular portions with the cylindrical surface of the arbor. Since the entire paddle is magnetic, it tends to rotate toward alignment with the magnetic field established by magnetic structure 85 and therefore serves as the driven element of the meter movement in the same general fashion as do vanes 27 in the movement illustrated in FIG. 9. Since the paddle 91 is immersed in the viscous damping liquid, and since the broad surfaces of the paddle face generally in the direction of rotation of the arbor, the paddle also acts as a damping member to restrain the meter movement against rotation. In this embodiment, the two halves of the paddle are identical, and so have equal volumes, and the entire paddle is of one material. Thus, the entire movement assembly, consisting of arbor 26', magnetic member 32' and paddle 91, is statically balanced when immersed in the viscous damping material filling the chamber defined by housing 34 and plate 15.

As seen in the modified form illustrated in FIG. 11, a combined damping member and magnetically driven element of the type just described can be made in two halves, one of a magnetic material, the other non-magnetic. Thus, paddle 94 includes separate vane portions 95, 96 of equal volume, vane portion 95 being of magnetic alloy and vane portion 96 of a non-magnetic alloy having the same density. At its edge adjacent arbor 26", portion 95 is provided with a pair of identical rectangular projections 97 which are spaced axially of the arbor and are each slit, as at 98, to allow each projection to be formed into a pair of opposed semi-circular portions embracing the arbor to fix vane portion 95 to the arbor. At its edge adjacent the arbor, vane portion 96 is provided with a single rectangular projection 99 which is provided with two slits, allowing projection 99 to be formed into three semi-circular portions embracing the arbor, as shown, to fix vane portion 96 to the arbor. The dimensions of projections 97 and 99 are such that the volume of projection 99 equals the sum of the volumes of projections 97. Vane portions 95, 96 are of sheet metal of the same thickness and, save for mounting projections 97, 99, are identical in shape and dimension. Accordingly, the assembly illustrated in FIG. 11 is statically balanced when immersed in the viscous liquid filling the chamber defined by housing 34 and plate 15.

In all of the embodiments hereinbefore described, the damping member is combined directly with the meter movement so that the meter movement itself is necessarily at least partially submerged in the viscous damping material. FIGS. 12–14 illustrate a further embodiment of the invention wherein the damping means is physically separated from the meter movement but is operatively connected to the meter movement to restrain the same against rotation.

Referring now to FIGS. 12–14, it will be seen that the load indicator or demand meter of this embodiment includes a main frame member 100 formed integrally from non-magnetic material, a movement housing 101, a movement 102, magnet field producing means 103 and damping means 104. Frame member 100 is identical with frame 1, FIG. 1, and it will be understood that the present embodiment includes the same mounting means and housing elements hereinbefore described with reference to the embodiment shown in FIGS. 1–9, so that the meter is associated with a conductor (not shown in FIG. 12) in the manner hereinbefore described to respond to changes in current flow in the conductor.

Housing 101 includes a cup-shaped main portion having a cylindrical side wall 105 and a transverse wall 106 provided with a cylindrical bore 107. The front end of bore 107 is closed by a forwardly projected cup-shaped structure formed integrally with wall 106 and including a cylindrical wall 108 and a transverse wall 109, walls 105 and 108 being coaxial. Transverse wall 106 is of substantial thickness and an annular interiorly threaded body 110 extends rearwardly therefrom to receive a threaded closure plug 111.

Thus, walls 105 and 106 define a forwardly opening chamber containing the movement 102, while walls 108 and 109, together with bore 107 and plug 111, define a sealed cylindrical chamber housing the damping means 104.

At the forward end of wall 105, housing 101 is provided with a transversely and outwardly projecting annular flange 112 seated in a circular notch in frame 100 and secured to the frame, as by screws 113. A pivot bearing plate 114 extends transversely across the open front of housing 101, being secured to bosses 115 by threaded studs 116. The movement 102 includes an arbor 117 having its ends engaged in aligned bearing depressions provided, respectively, in the front surface of wall 109 and the rear surface of plate 114. Adjacent to wall 109, there is secured to the arbor a U-shaped magnetic bar 118. Bar 118 has end portions which extend parallel to but are spaced slightly outwardly from cylindrical wall 108, these end portions advantageously being curved transversely to match the curvature of wall 108. Immediately in front of bar 118, there are fixed to arbor 117 four thin circular magnetic vanes 119. The vanes 119 are identical in size and shape and are each provided with a circular opening offset radially from the center of the vane. A suitable supporting bushing extends through all of said openings, the vanes being staked or otherwise secured to the bushing and the bushing being fixed to the arbor. Before being so secured, the vanes 119 are adjusted rotationally so that the first and third of the series of four vanes extend mainly from one side of the arbor while the second and fourth vanes extend mainly in the opposite direction, as will be clear from FIG. 13. Accordingly, the assembly of vanes 119 constitutes a magnetic unit which is effectively elongated diametrically of arbor 117 so that, if a magnetic field is established transversely across the arbor in the area of the vanes, the vane assembly will tend to align itself with such field and, being fixed to the arbor, will tend to rotate the arbor accordingly.

Also fixed to arbor 117, and extending in front of and parallel to flange 112 and frame member 1, is the present reading pointer 120. The meter is provided with a suitable scale 121, as hereinbefore described, so that rotation of the movement 102 results in movement of pointer 120 over scale 121. The meter also includes a maximum reading pointer 122 and reset means 123, identical with the corresponding elements hereinbefore described in detail in reference to FIGS. 1–9.

As will be clear from FIG. 14, the device employs a laminated, U-shaped magnetic structure 124 constructed and arranged precisely as hereinbefore described with reference to structure 85, FIGS. 1 and 3, such structure being effective to establish a magnetic field across the meter movement in accordance with current flow in the conductor with which the meter is associated, all as hereinbefore described in detail.

At its rear face, at the mouth of bore 107, wall 106 of housing 101 is provided with a pair of diametrically opposed notches in which are seated the ends of a bearing bar 125. A circular gasket 126 is disposed over bar 125 and the rear face of wall 106, the combination of gasket 126 and plug 111 serving both to seal the damping chamber and the clamp bar 125 in place.

The rear face of wall 109 and the front face of bar 125 are each provided with a bearing depression, and arbor 127 has its ends engaged respectively in such depressions, the depressions being so located that arbor 127 is disposed in axial alignment with arbor 117. Adjacent wall 109, there is fixed to arbor 127 a diametric magnetizing circular disc magnet 128. Immediately behind magnet 128, a vaned damping rotor 129 is also fixed to arbor 127. As will be clear from FIGS. 12 and 14, rotor 129 includes a flat main body 130 lying transversely of arbor 127 and a pair of flat vanes 131 lying in planes parallel to the axis of arbor 127. The two halves in body 130 are identical. Vanes 131 are identical and are disposed in identical positions opposed across the arbor 127. Magnet 128 and rotor 129 are centered on arbor 127. Magnet 128 is homogeneous, as is also rotor 129. Accordingly, the assembly consisting of arbor 127, magnet 128, and rotor 129 is rotationally balanced statically and dynamically about the axis of arbor 127.

Magnet 128 is located between the ends of magnetic bar 118, the wall 108 being thin and the space between the periphery of the magnet and the ends of bar 118 being relatively small, so that a good magnetic coupling is established between bar 118 and magnet 128. Accordingly, when the meter movement 102 turns, its rotational movement is necessarily transmitted to the rotational assembly, consisting of elements 127, 128 and 129, of the damping means 104. The chamber defined by walls 108, 109, bore 107 and plug 111 is filled with a viscous damping liquid, advantageously a silicone oil, so that both magnet 128 and rotor 129 are fully submerged therein. Accordingly, damping means 104 is effective to provide a substantial resistance to rotation of the meter movement. Considering the magnitude of the rotational forces involved, the magnet coupling comprising elements 118 and 128 constitute a substantially direct driving connection between arbors 117 and 127. Hence, when a magnetic field is established across the meter movement, the resulting rotational force applied to the meter movement is resisted by the viscous liquid surrounding the rotary assembly of damping means 104. As a result of such resistance, transient surges in current in the conductor with which the device is associated result in little or no rotation of the meter movement and therefore in little or no movement of pointers 120 and 122. However, a prolonged change in current flow, reflected in a prolonged change in the magnetic field applied by means 124 across the meter movement 102, results in gradual rotation of the meter movement until the longer diametric dimension of the assembly of vanes 119 is more closely in alignment with the magnetic field. Such gradual turning of the movement is permitted because of the gradual turning of magnet 128 and rotor 129 in the surrounding viscous liquid.

Since both magnet 128 and rotor 129 are of homogeneous one-piece construction, and are centered on arbor 127, the rotary assembly of damping means 104 is statically balanced when immersed in the viscous damping liquid.

The construction of the embodiment shown in FIGS. 12 and 14 is included herein as another advantageous embodiment of a highly over damped slow response meter constructed in accordance with the invention. Structural features of this embodiment are claimed in my copending application Serial Number 45,458, filed concurrently herewith.

In all of the embodiments discussed herein, the construction and arrangement of parts which are immersed in the viscous damping material is such that these parts are statically balanced when so immersed. Accordingly, the meter construction shown and described can be balanced in air and then assembled, with damped parts thereof immersed in the viscous damping material, there being no requirement for further balancing after the parts are so immersed.

In general, the assembly immersed in the viscous damping material can, in accordance with the invention, be made to be statically balanced when so immersed by three procedures, or by combinations of different ones thereof. First, the entire meter movement can be made of a single material, as would be the case if all parts of the assembly of FIG. 10 were of the same material. Next, where different parts of the meter movements are made of different materials, static balance of the immersed movement is assured by making each part of the movement completely balanced within itself alone. Thus, assuming that the arbor 26′, the magnetic member 32 and the combined damping member and driven element 91, FIG. 10, are all of different materials, it will be obvious that the completed assembly will be statically balanced when immersed in the viscous damping material because each of the three elements making up the assembly is balanced within itself alone. The third approach to obtaining static balance in accordance with the invention is to employ in the meter movement parts which, while not balanced in themselves alone, are balanced by another part or other parts made of a material of the same density. Thus, considering the assembly of FIG. 11, for example, vanes 95 and 96 are of different materials and are not statically balanced each within themselves. Static balance is achieved, however, because the materials from which the two vanes are formed have the same density. The embodiment of FIG. 11 also illustrates the principle of achieving static balance by using two different approaches. Thus, while vanes 95 and 96 constitute elements which balance each other and made of materials having the same density, the magnetic member 32″ is completely balanced within itself alone.

While particularly advantageous embodiments have been described and shown herein to illustrate the invention, it will be understood that numerous changes and modifications are possible without departing from the scope of the appended claims.

I claim:

1. In a highly over damped electrical meter, the combination of
    support means;
    means carried by said support means and forming a fully closed and sealed chamber;
    a rotary moving system adapted for movement in response to an electromagnetic field and comprising an arbor, and
        at least one rotary damping member fixed to said arbor,
        said moving system being disposed wholly within said chamber,
        said chamber being filled with a viscous damping material having a density different from that of air and said moving system being immersed in said damping material;
    movable indicating means carried by said support means and disposed wholly outside of said chamber;
    means magnetically coupling said rotary moving system to said indicating means through an unbroken wall portion of said chamber; and
    electromagnetic means carried by said support means and disposed wholly outside of said chamber for establishing an electromagnetic field to drive said rotary moving system,
    said damping member being of substantial size relative to the other elements of said rotary moving system and said rotary moving system being statically balanced when immersed in said damping material,
    said support means and indicating means being so constructed and arranged that, in use, the meter can be disposed in any of various different positions which may be required for viewing of said indicating means, said moving system being operative to move said indicating means in accordance with the field established by said electromagnetic means regardless of the position in which the meter is disposed.

2. An electrical meter in accordance with claim 1 and wherein
said rotary moving system comprises
a magnetic vane,
a nonmagnetic vane,
said vanes being fixed to and projecting radially from said arbor in opposite directions and each lying in a plane transverse to the axis of said arbor,
said vanes being of materials of substantially the same density and being of equal volume; and
said damping member is fixed to said arbor and comprises at least two radially projecting vane portions facing in the direction of rotation of said arbor, said vane portions being identical and of the same material.

3. An electrical meter in accordance with claim 1 and wherein said moving system comprises a single magnetic paddle fixed to said arbor and having opposed portions projecting radially from said arbor and facing at least generally in the direction of rotation of said arbor, said single paddle constituting both said damping member and a driven element of said rotary moving system.

4. An electrical meter in accordance with claim 1 and wherein
said rotary moving system comprises a member having two opposed radial vane portions, at least one of said vane portions being magnetic and both of said vane portions being of the same density, said member constituting both said rotary damping member and a driven element of said moving system.

References Cited in the file of this patent
UNITED STATES PATENTS

| | | |
|---|---|---|
| 1,452,591 | Brogger | Apr. 24, 1923 |
| 1,515,634 | Vawter | Nov. 18, 1924 |
| 2,057,845 | Pattee | Oct. 20, 1936 |
| 2,622,707 | Faus | Dec. 23, 1952 |
| 2,623,083 | Schlumberger | Dec. 23, 1952 |